United States Patent [19]

Watson

[11] 4,340,081

[45] Jul. 20, 1982

[54] IRRIGATION VALVE APPARATUS

[76] Inventor: Wade B. Watson, 1256 W. Williams Field Rd., Suite 11, Chandler, Ariz. 85224

[21] Appl. No.: 161,278

[22] Filed: Jun. 20, 1980

[51] Int. Cl.³ .............................................. F16K 31/122
[52] U.S. Cl. .................................. 137/364; 251/63.5; 251/147; 405/41
[58] Field of Search .................. 137/364, 368, 372; 251/63, 63.5, 63.6, 145, 147; 405/41, 40

[56]  References Cited

U.S. PATENT DOCUMENTS

| 1,950,335 | 3/1934 | Weatherstone | 405/41 |
| 2,646,076 | 7/1953 | Bonander | 251/147 |
| 2,778,598 | 1/1957 | Bolling | 251/63 |
| 3,552,658 | 1/1971 | Sons | 251/63.5 X |

FOREIGN PATENT DOCUMENTS 16216 2/1934 Australia .............................. 251/63

Primary Examiner—Robert G. Nilson
Attorney, Agent, or Firm—H. Gordon Shields

[57]  ABSTRACT

Valve apparatus for controlling the flow of irrigation water includes a valve plate in the irrigation water line, and a piston connected to the valve plate and movable in a cylinder, with fluid pressure in the cylinder opposing the movement of the valve plate to control the flow of irrigation water from the irrigation line.

4 Claims, 4 Drawing Figures

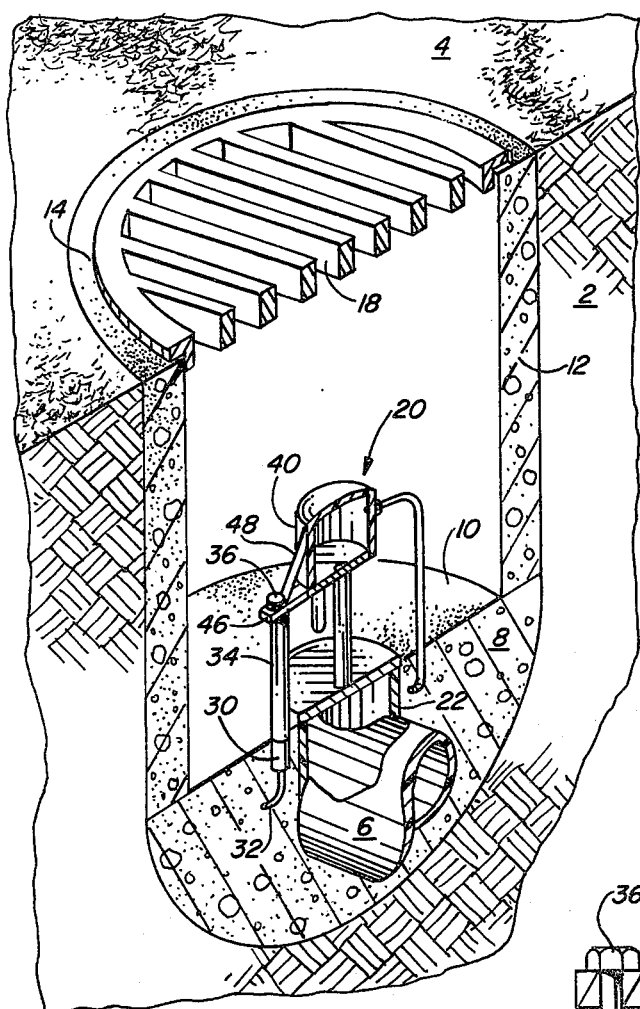
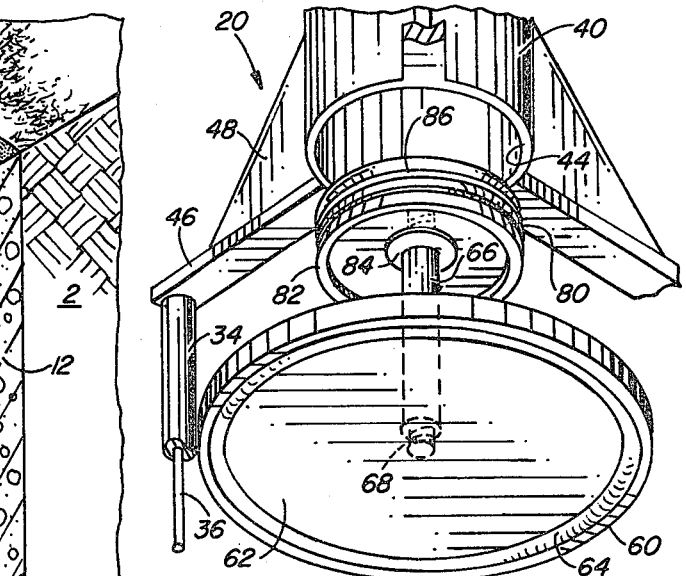
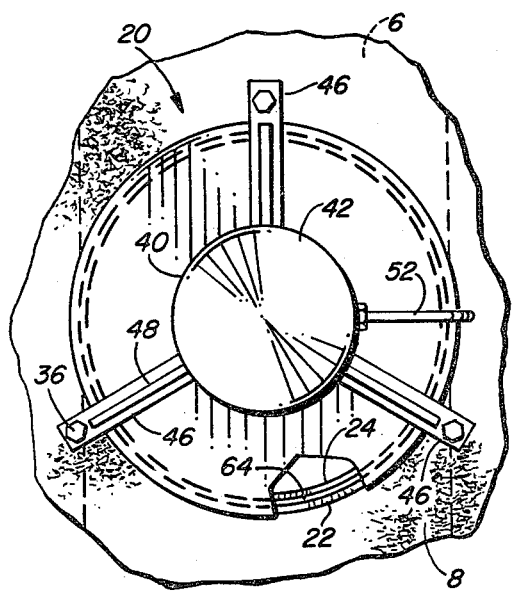
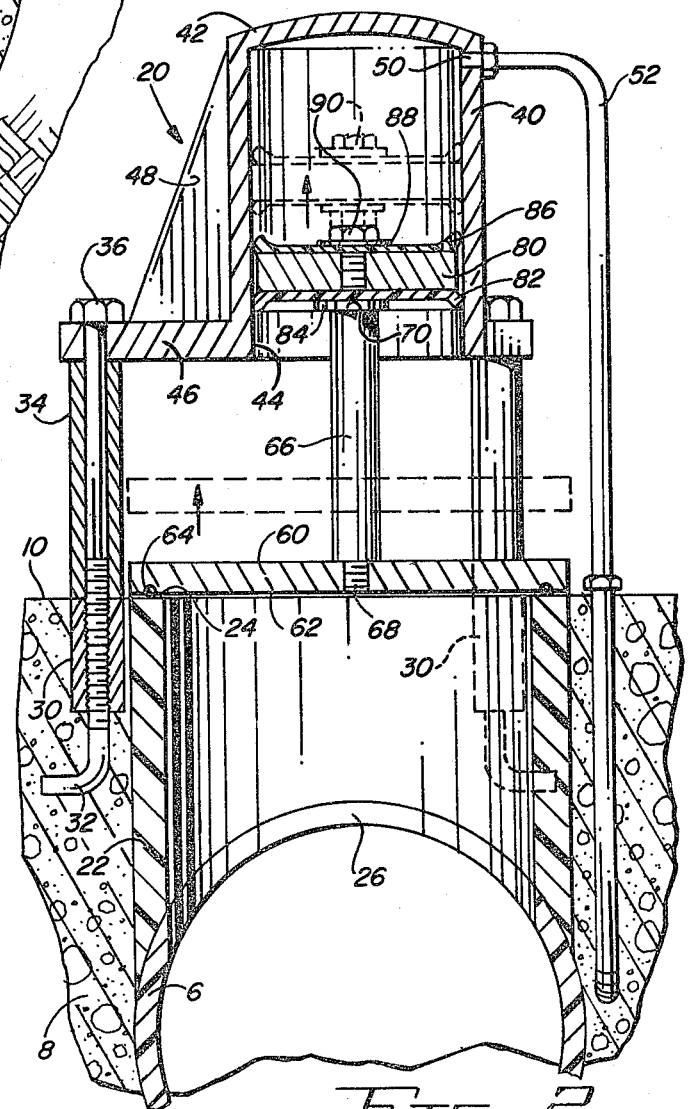

IRRIGATION VALVE APPARATUS

BACKGROUND OF THE INVENTION

1. Field of the Invention

This invention relates to valve apparatus and, more particularly, to valve apparatus for controlling the flow of irrigation water from an irrigation water line.

2. Description of the Prior Art

The proper utilization of the water for the irrigation of agricultural crops has been of increasing concern for a number of years for several different reasons. One reason is the consideration of water, itself. For example, in many parts of the country, particularly the southwest, the ground water table is lowering as water is pumped from the underground aquafers and reservoirs faster than it is being replenished by nature. Another reason of substantial importance is the effect of water in varying amounts on growing crops. While the effects of too little water are well known, it has been only recently that scientific studies have determined that there may be an optimum amount of water for a given crop, and that water in excess of the optimum amount of water is literally wasted. If, therefore, depending on the soil conditions and on the particular crop being watered, the optimum amount of water is available, maximum yield may be obtained.

In an effort to improve the efficiency of irrigation, the so-called "dead level" or basin irrigation system has been developed in recent years. To prevent pooling in low areas and runoff from higher areas, fields are leveled using the most efficient and accurate contemporary methods, such as laser controlled levelling techniques.

In order to provide the proper amount of water for field crops for irrigation purposes, valves are located periodically along water lines extending in the fields. Valves are actuated to allow water to flow onto the fields, thus providing the necessary irrigation water.

U.S. Pat. No. 946,516 discloses a hand-operated irrigation valve for controlling the flow of water from a closed conduit.

U.S. Pat. No. 1,960,284 discloses a valve controlled by changes of pressure in the fluid system. The internal pressure is utilized to control flow through the valve, with changes in the upstream pressure and downstream pressure being used to actuate the valve.

U.S. Pat. No. 2,243,711 discloses an air loaded relief valve which utilizes a pair of pistons secured to a common shaft. The pistons each have different diameters.

U.S. Pat. No. 2,646,076 disloses a manually operated piston movable to control fluid flow in an irrigation system.

U.S. Pat. No. 2,696,361 discloses a spring loaded valve held closed by the spring. Air acting on the bottom of a piston opens the valve when the air pressure overcomes the bias of the spring holding the valve closed.

U.S. Pat. No. 2,778,598 discloses valve apparatus actuated by pressure acting on one side of a piston. Pressure on the opposite side of the piston closes the valve against the pressure of the fluid flowing through a conduit. The pressure of the fluid flowing through the conduit accordingly causes the valve to open when the fluid pressure exceeds the control pressure on the opposite side of the piston. A double piston arrangement is also used.

U.S. Pat. No. 3,251,377 discloses a diaphragm used to control a valve by pressure applied to one side of the diaphragm. The pressure causes a valve member secured to the diaphragm to close. Reducing pressure on the diaphragm allows pressure of the fluid in the system to open the valve.

U.S. Pat. No. 3,552,658 discloses another piston and cylinder arrangement in which a spring is used to secure a piston to a cylinder head, and the spring provides a bias against the piston to open the valve. The valve is closed against the spring bias by air pressure acting on the piston.

U.S. Pat. No. 4,031,915 discloses a valve arrangement for an irrigation system which includes a plurality of drip tubes connected to a pressurized water supply. A valve element is freely movable within a cylinder in response to pressure differences, and pressure on one side of the valve is used to control the position of the valve to regulate the flow of water through the drip tubes. The valve comprises a piston moved in its cylinder by the force of the pressurized water on one side of the piston as against the force or pressure of the irrigation water on the opposite side of the piston.

SUMMARY OF THE INVENTION

The invention described and claimed herein comprises a valve plate in an irrigation water line secured to a piston movable in a cylinder disposed above the valve plate and within the flow of water. Control pressure in the cylinder acts on the piston in one direction, while the pressure from the flow of the water in the irrigation line acts directly on the valve plate. Movement of the valve plate in response to the pressure of a control fluid on one side of the piston and to the pressure of the water supply acting on the valve plate causes the plate to move, thus allowing water from the water line to flow through the valve.

Among the objects of the present invention are the following:

To provide new and useful valve apparatus;

To provide new and useful valve apparatus for an irrigation system;

To provide new and useful valve apparatus for controlling the flow of irrigation water;

To provide new and useful valve apparatus having a piston movable in a cylinder and secured to a valve plate; and To provide new and useful apparatus for controlling the flow of irrigation water from an irrigation line.

BRIEF DESCRIPTION OF THE DRAWING

FIG. 1 is a perspective view in partial section of the apparatus of the present invention shown in its use environment.

FIG. 2 is a side elevation view in partial section of the apparatus of the present invention.

FIG. 3 is a top plan view of the apparatus of the present invention.

FIG. 4 is a bottom perspective view of a portion of the apparatus of the present invention.

DESCRIPTION OF THE PREFERRED EMBODIMENT

FIG. 1 is a perspective view in partial section of valve apparatus 20 of the present invention shown in its use environment secured to a water line 6. FIG. 2 is a view in partial section of the valve apparatus 20, looking along the longitudinal axis of the water line 6. FIG. 3 is a top view of the valve apparatus 20, while FIG. 4 is a bottom perspective view of a portion of the valve apparatus 20. For the following discussion, reference will be made to FIGS. 1, 2, 3, and 4.

Irrigation water flows through the pipe or line 6 for the purpose of irrigating a field 4. Accordingly, it is disposed beneath the surface of the ground. In FIG. 1, reference numeral 2 is used to designate the soil or ground, and reference numeral 4 is used to designate the level top surface, or field, of the ground 2. When the pipe line 6 is pressurized with water, valves, such as the valve 20, will be actuated periodically to allow water from the water line 6 to flow onto the field 4 for irrigating crops planted in the ground 2. Accordingly, along a single water line or leg 6, there will be a plurality of valves 20, each spaced apart from the adjacent valves along the water line. Since the water flowing in the line 6 may be under a substantial pressure or head, the location of each of the valves 20 along the line 6 is in a stable environment. The environment includes a concrete base 8 disposed around the line 6. The concrete base 8 extends upwardly, above the pipe 6 a distance which is substantially the height of a saddle 22 secured to the line 6 and extending upwardly therefrom. The top surface 10 of the concrete base is relatively flat, but need not be precisely smoothly finished.

Spaced apart from the valve apparatus 20, substantially coaxially aligned therewith, and disposed on top of the base 8, is a cylindrically configured vertical pipe 12. The pipe 12 includes a top 14 which is aligned with the top surface 4 of the ground 2. A circular, and radially outwardly extending, peripheral flaange for a metal grate 18 rests on the top 14 of the pipe 12.

The valve apparatus 20 is appropriately secured to the saddle 22 and the valve apparatus 20 controls the flow of water from the pipe 6, upwardly through the saddle 22 and through the pipe 12, the grate 18, and onto the surface 4 of the field. Since the field is substantially level, the flow of water on the surface of the field does not pool and does not run off. Rather, it spreads out evenly. A plurality of water lines 6, with a plurality of valves, such as the valves 20, spaced apart on each line, are used to irrigate each field.

The saddle 22 includes a circularly extending top 24 which defines an annular valve seat. The top 24 is preferably about the same level or height as the top 10 of the concrete base 8.

Three anchors 30 extend downwardly into the concrete base 10. The anchors 30 are spaced apart about 120° from each other, and are disposed radially outwardly from the saddle 22. The anchors 30 are internally tapped to receive threaded rods. Each anchor 30 receives an anchor bolt, such as the bolt 32 shown in FIGS. 1 and 2. The anchor bolts 32 each include a threaded shank which engages the internal threads of the anchors 30. The anchor bolts also include outwardly extending portions which are disposed in the concrete. The anchors 30, with their bolts 32, are set into the concrete base 8 at the time the base 8 is poured about the line 6 and the saddle 22.

The base 8 is an integral part of the water line 6 and the valve apparatus 20. Typically, a circular hole is dug into the ground along the trench where the line 6 is to be placed. After the line 6 is laid in the trench, the saddles 22 are secured to the pipe, preferably by solvent welding, as in the case of PVC pipe. PVC is pipe typically used in contemporary irrigation lines. A plurality of saddles is connected to each line, with each spaced apart from adjacent saddles for the appropriate diffusion of the irrigation water on the field.

After a saddle 22 is secured to the irrigation line 6, the portion of the line 6 within the saddle 22 is cut away to define an opening 26 through which water flows from the pipe 6 into the saddle 22, and upwardly, as will be discussed below.

After the saddle 22 is appropriately secured to the pipe 6, the concrete base 8 is then poured in the hole around the pipe 6 and the saddle 22. The anchor bolts 32 are secured to the anchors 30 and the anchors and bolts are then set in the uncured concrete about the saddle 22. Care is exercised in the setting of the anchors 30 and the bolts 32 secured to the anchors, for purposes that are discussed below.

The concrete pipe 12 is set on the top 10 of the base 8. The pipe 12 extends upwardly from the base 8 to the surface 4 of the field (ground) which is to be irrigated. The top of the pipe 12 is covered by the grate 18. Water from the pipe or line 6 flows upwardly through the pipe 12, and through the grate 18 onto the top 4 of the field.

Flow of water from the pipe 6 through the saddle 22 is controlled by fluid pressure within a cylinder 40 acting against a piston 80 which is in turn connected to a valve plate 60. The valve plate 60 seats against the top 24 of the saddle 22 to prevent water from flowing through the saddle 22 from the line 6. As stated above, the top 24 of the saddle 22 acts as a valve seat for the valve plate 60.

The cylinder 40 is secured to the base 8 about the saddle 22. It is disposed substantially coaxially with the saddle. The cylinder 40 includes a cylinder head 42, remote from the saddle 22, and a bore 44 within the cylinder 40. The bore 44 extends downwardly from the head 42 and faces, or is open towards, the saddle 22. The diameter of the cylinder 40 is substantially less than the diameter of the valve plate 60.

The cylinder 40 is disposed above the saddle 22 and is secured in place on the base 8 by a plurality of feet or webs 46 which extend outwardly from a lower portion of the cylinder 40, remote from the head 42. The feet or webs extend radially outwardly from the cylinder, and the outer portions of the feet are disposed on spacers 34. The feet 46 are secured to the spacers 34 and to the base 8 by cap screws or bolts 36 which threadedly engage the interior of the anchors 30. The spacers 34 are disposed radially outwardly from the cylinder 40, and are substantially coaxially aligned therewith. The spacers define guides for guiding the valve plate 60 as it moves upwardly and downwardly in response to fluid pressure within the cylinder 40 above the piston 80. As best indicated in FIG. 3, there are three spacers 34 and accordingly three webs 46. If desired, it is obvious that more than three spacers, and accordingly webs, etc., may be used.

The cylinder 40 is positioned in alignment with the saddle 22 so that the valve plate 60 makes an appropriate, sealing contact with the valve seat 24. Vertical movement of the valve plate 24 is guided by the spacers 34. Accordingly, the positioning of the anchors 30 is important with respect to the functioning of the valve apparatus 20.

Gussets 48 extend from the exterior of the wall of the cylinder 40 to the feet 46. The gussets comprise reinforcing elements for the cylinder 40 and for the feet 46. As best shown in FIG. 2, the gussets 48 are of a generally triangular configuration, extending vertically, with respect to the cylinder 40, nearly the full length thereof, and along the feet or webs 46 to adjacent the head of the cap screws 36.

The piston 80 moves vertically upwardly and downwardly in the bore 44 of the cylinder 40. The piston includes, or has secured thereto, a lower wiping cup 82 and an upper sealing cup 86. The cups, preferably made of neoprene, or the like, are well known and understood in the art. Adjacent the cups 82 and 86 are a pair of washers 84 and 88, respectively.

The lower, or wiping, cup 82 provides a cleaning function with respect to the bore 44 of the cylinder 40. As is known and understood, the water flowing from the pipe line 6 through the saddle 22 is generally not clear, pure water. Rather, impurities, silt, and the like, are typically included in the flow of water. Since the portion of the cylinder 40 and its bore 44 below the piston 80 and the wiping cup 82 is subjected to the flow of the water, the cup 82 cleans the cylinder walls or interior bore 44 as the piston 80 moves downwardly. This allows the cylinder walls to be smooth and clean and accordingly prevents damage and wear between the piston 80 and the cylinder 40.

The upper, or sealing, cup 86 seals the piston 80 with respect to the cylinder 40 and with respect to the pressure above the piston 80 and within the cylinder 40. As is well known and understood, the lips of the sealing cup 86 face the pressurized area within the cylinder 40.

The piston 80 is connected to the valve plate 60 through a rod 66. The rod 66 includes a threaded lower end 68. The threaded end 68 matingly engages an internally threaded bore or portion of the valve plate 60. At the upper portion of the rod 60 is a shoulder 70. The washer 84 is disposed on the shoulder 70. The cup 84 in turn bears against the washer 84. The piston 80 is disposed on the top of the cup 82 and is secured to the rod 66 by a cap screw or bolt 80. As best shown in FIG. 2, the sealing cup 86 is disposed on the upper or top surface of the piston 80, and the washer 88 is disposed on top of the cup 86 and beneath the head of the bolt or cap screw 90.

The valve plate 60 is a circular plate which is secured to the rod 66 and accordingly to the piston 80. Movement of the piston 80 in the cylinder 40 results in the corresponding movement of the valve plate 60.

The valve plate 60 includes a lower face 62 which faces the saddle 22 and its bore. The lower face 62 includes a groove which is generally circular and which receives an O-ring or sealing element 64. The sealing element 64 is disposed against the top surface or valve seat 24 of the saddle 22 when the plate 60 is in its downward or closed position. The sealing element 64 serves to seal the valve apparatus to prevent the flow of water from the pipe 6, into and through the saddle 22, and upwardly through the pipe 12 and the grate 18 onto the field in which the valve apparatus 20 is located.

The flow of water through the valve apparatus 20 is controlled by pressure within the cylinder 40 above the piston 80. Fluid pressure is communicated into the cylinder 40 through an aperture 50 in the wall of the cylinder 40, or, alternately, through the head 42, as desired. The fluid pressure flows through a control line 52, which is connected to the aperture 50 of the cylinder 40. The flow of water through the valve apparatus 20 from the water line 6 acting against the valve plate 60 is balanced against the pressure within the cylinder 40 acting on the piston 80. When pressure within the cylinder 40 above the piston 80 is reduced through the control line 52, the pressure of the water flowing against the valve plate 60 causes the valve plate and the piston 80 to move upwardly, as indicated by the arrows adjacent the valve plate and piston in FIG. 2. The opening movement of the two elements 60 and 80 of the valve apparatus 20 is also indicated by outlines of the valve plate 60 and the piston 80 in phantom in FIG. 2.

The line 52 for the control pressure for the cylinder 40 is preferably disposed in the ditch alongside the water line 6. The line 52 extends upwardly through the base 8, as shown in FIGS. 1 and 2. Appropriate fittings for the terminal segment of the control line 52 within the pipe 12, between the base 8 and the aperture 50 of the cylinder 40, allows the terminal segment to be connected, as desired, after the base 8 is poured and at the time of the installation of the cylinder 40.

For large fields or installations, a central location for the control of a plurality of valve apparatus 20 connected to a plurality of lines 6 may be the most convenient way to control the irrigation of a field. On a single water line 6, there may be a substantial number of control valves 20, and there may be a number of water lines 6 spaced apart over a field. Generally, only one valve is opened at any one time on a single line.

It will be noted that the pipe 12 is relatively larger in diameter as compared to the diameter of the water line 6. This difference in size allows the flow of water from the line 6 to decrease substantially in velocity before flowing onto the top 4 of the field.

While the principles of the invention have been made clear in illustrative embodiments, there will be immediately obvious to those skilled in the art many modifications of structure, arrangement, proportions, the elements, materials, and components used in the practice of the invention, and otherwise, which are particularly adapted for specific environments and operative requirements without departing from those principles. The appended claims are intended to cover and embrace any and all such modifications, within the limits only of the true spirit and scope of the invention. This specification and the appended claims have been prepared in accordance with the applicable patent laws and the rules promulgated under the authority thereof.

What is claimed is:

1. Valve apparatus for controlling a flow of water, comprising, in combination:
   a water line providing a flow of water;
   a valve seat means secured to the water line;
   base means including a base secured to the water line and to the valve seat means and a pipe disposed on the base for receiving the flow of water from the water line;
   cylinder means disposed adjacent to the valve seat means and within the pipe, including
      a cylinder spaced apart from the valve seat means, and
      spacer means secured to the base and to the cylinder for supporting the cylinder spaced apart from the valve seat means within the pipe;
   a piston movable in the cylinder of the cylinder means;
   a rod connected to the piston;
   a valve plate disposed within the spacer means and secured to the rod remote from the piston and movable therewith from a closed position against the valve seat means to an open position away from the valve seat means in response to the flow of water against the valve plate and in response to movement of the piston in the cylinder means; and pressure means connected to the cylinder means for controlling the movement of the piston in the cylinder and movement of the valve plate in response to the flow of water.

2. The apparatus of claim 1 in which the valve seat means includes a saddle connected to the water line for receiving the flow of water from the water line, and a top rim on the saddle defining a valve seat for receiving the valve plate to prevent the flow of water from the water line and through the saddle.

3. The apparatus of claim 2 in which the spacer means includes a plurality of spacers extending between the cylinder and the base and disposed radially with respect to the rod and to the piston and valve plate secured thereto and spaced apart from each other to allow for the flow of water from the water line and the saddle when the valve plate is not disposed on the valve seat.

4. The apparatus of claim 3 in which the pipe of the base means is substantially larger in diameter than the water line to allow for a slowing in velocity of the flow of water from the water line.

* * * * *